(12) United States Patent
Abe

(10) Patent No.: US 8,102,157 B2
(45) Date of Patent: Jan. 24, 2012

(54) MULTI-OUTPUT POWER SUPPLY DEVICE HAVING CHARGE PUMP CIRCUIT

(75) Inventor: Hirohisa Abe, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 400 days.

(21) Appl. No.: 12/376,327

(22) PCT Filed: May 16, 2008

(86) PCT No.: PCT/JP2008/059501
§ 371 (c)(1),
(2), (4) Date: Feb. 4, 2009

(87) PCT Pub. No.: WO2009/008223
PCT Pub. Date: Jan. 15, 2009

(65) Prior Publication Data
US 2010/0237833 A1    Sep. 23, 2010

(30) Foreign Application Priority Data
Jul. 11, 2007  (JP) .................. 2007-182230

(51) Int. Cl.
*H02J 7/10*  (2006.01)
*G05F 3/16*  (2006.01)

(52) U.S. Cl. ........................................ 320/166; 323/316
(58) Field of Classification Search ................ None
See application file for complete search history.

(56) References Cited

U.S. PATENT DOCUMENTS

| | | | |
|---|---|---|---|
| 5,677,874 A | 10/1997 | Yamano | |
| 5,703,412 A * | 12/1997 | Takemoto et al. | 307/10.1 |
| 5,798,985 A * | 8/1998 | Nakajima | 368/64 |
| 6,317,122 B1 | 11/2001 | Yamazaki | |
| 6,864,664 B2 * | 3/2005 | Clift | 320/128 |
| 7,126,595 B2 * | 10/2006 | Yanagi et al. | 345/211 |
| 7,148,665 B2 * | 12/2006 | Agari et al. | 323/268 |
| 2002/0036636 A1 | 3/2002 | Yanagi et al. | |
| 2004/0174179 A1 | 9/2004 | Batey | |
| 2007/0108958 A1 | 5/2007 | Minakuchi et al. | |

FOREIGN PATENT DOCUMENTS

| | | |
|---|---|---|
| JP | 8-297986 | 11/1996 |
| JP | 2000-236657 | 8/2000 |
| JP | 2000-278937 | 10/2000 |

(Continued)

OTHER PUBLICATIONS

Nov. 25, 2010 Korean official action (including English translation thereof) in connection with a counterpart Korean patent application.

*Primary Examiner* — Vinh Nguyen
(74) *Attorney, Agent, or Firm* — Cooper & Dunham LLP (57) ABSTRACT

A multi-output power supply device of low noise is disclosed that converts a first input voltage to plural different voltages. The multi-output power supply device includes a first power supply circuit for generating a constant voltage from the first input voltage, and outputs the constant voltage through a first output terminal; and one or more second power supply circuits each including a charge pump circuit for generating a constant voltage from the output voltage from the first power supply circuit. Each of the second power supply circuits changes a period of a charging and discharging cycle for charging and discharging a flying capacitor according to an electric current output from the second output terminal.

12 Claims, 5 Drawing Sheets

FOREIGN PATENT DOCUMENTS

| | | |
|---|---|---|
| JP | 2002-62858 | 2/2002 |
| JP | 2002-123234 | 4/2002 |
| JP | 2002-291232 | 10/2002 |
| JP | 2003-348821 | 12/2003 |
| JP | 2005-312193 | 11/2005 |
| KR | 10-2007-0050827 | 5/2007 |

* cited by examiner

MULTI-OUTPUT POWER SUPPLY DEVICE HAVING CHARGE PUMP CIRCUIT

TECHNICAL FIELD

This disclosure relates to a multi-output power supply device that supplies plural output voltages, and particularly, to a multi-output power supply device which has a charge pump circuit and is able to reduce noise of output voltages.

BACKGROUND ART

In the related art, a technique is used to improve efficiency of a charge pump circuit by changing the frequency of a clock signal for driving the charge pump circuit.

Figure 4:
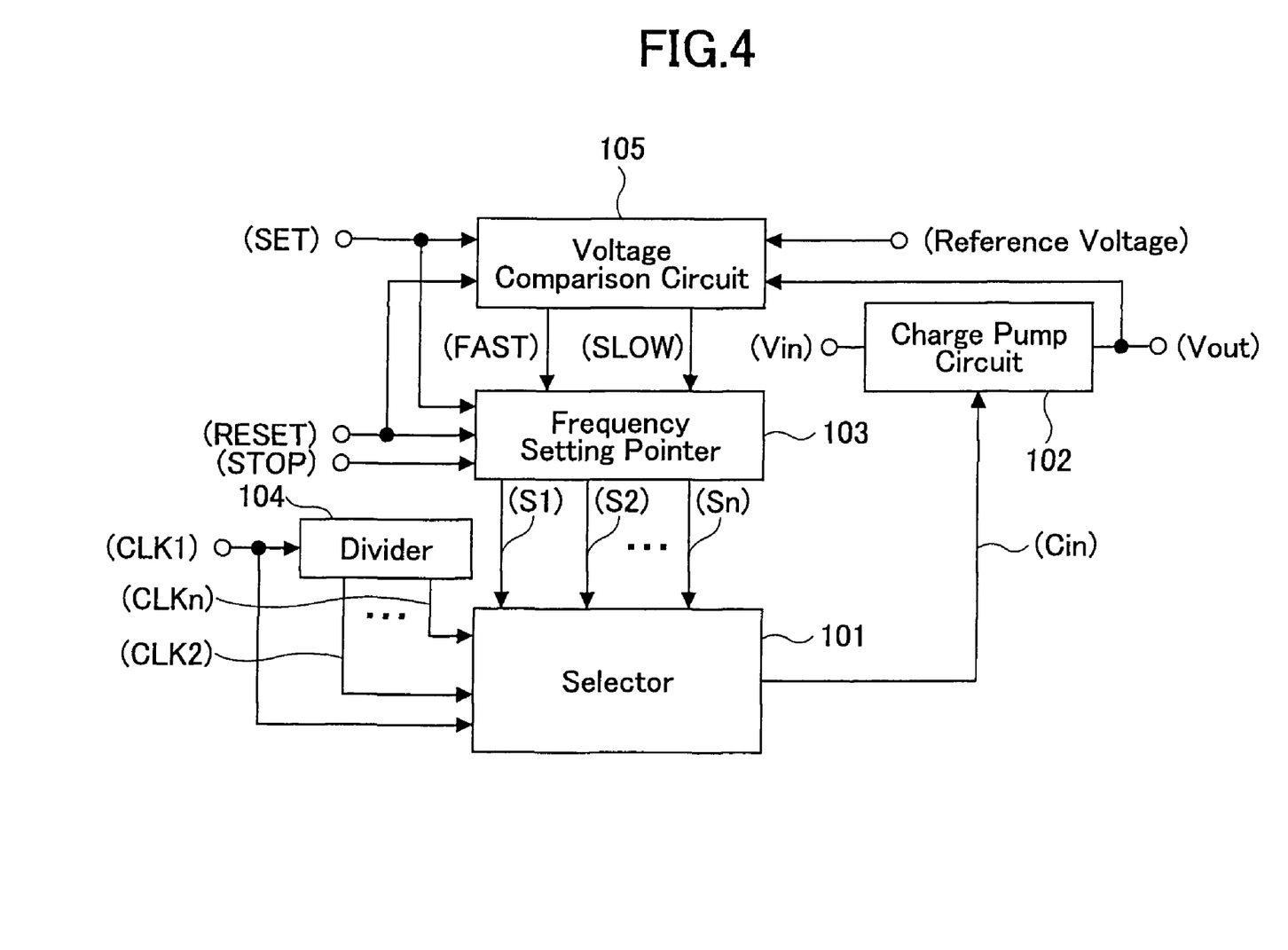
FIG. 4 is a block diagram exemplifying a configuration of a step-up circuit in the related art.

FIG. 4 is a block diagram exemplifying a configuration of a step-up circuit in the related art.

For example, the step-up circuit in FIG. 4 is disclosed in Japanese Laid Open Patent Application No. 2000-236657 (below, referred to as "reference 1").

In the step-up circuit in FIG. 4, a voltage comparison circuit 105 compares a reference voltage with the output voltage Vout of a charge pump circuit 102, and when a SET signal is input to the voltage comparison circuit 105, the voltage comparison circuit 105 sets a FAST signal status and a SLOW signal status depending on the comparison results.

The SET signal is also input to a frequency setting pointer 103, when the FAST signal is at a high level and the SLOW signal is at a low level, each time the SET signal is input, a high level signal among output signals S1 through Sn of the frequency setting pointer 103 shifts from S1 to Sn in order. To the contrary, when the FAST signal is at the low level and the SLOW signal is at the high level, each time the SET signal is input, a high level signal among the output signals S1 through Sn of the frequency setting pointer 103 shifts from Sn to S1 in order.

The output signals S1 through Sn of the frequency setting pointer 103 are input to a selector 101. Further, a clock signal CLK1, and clock signals CLK2 through CLKn, which are signals obtained by dividing the clock signal CLK1 with a divider 104, are also input to the selector 101. Depending on statuses of the output signals S1 through Sn of the frequency setting pointer 103, one of the clock signals CLK1 through CLKn, which signals are input to the selector 101, is selected and is output to the charge pump circuit 102 as a clock signal Cin.

In other words, when the FAST signal is at the high level, each time the SET signal is input, the frequency of the clock signal Cin is increased, and when the SLOW signal is at the high level, each time the SET signal is input, the frequency of the clock signal Cin is decreased.

In the related art, utilizing such a function, when resetting or powering on a system, a clock signal of a highest frequency is used to boost a voltage to a desired value in a time period as short as possible; in a low power consumption mode or a standby state, a clock signal of a lowest frequency is used to sustain the output voltage of the charge pump circuit 102 to be higher than a preset value. Therefore, the current consumption is reduced to be a minimum.

Figure 5:
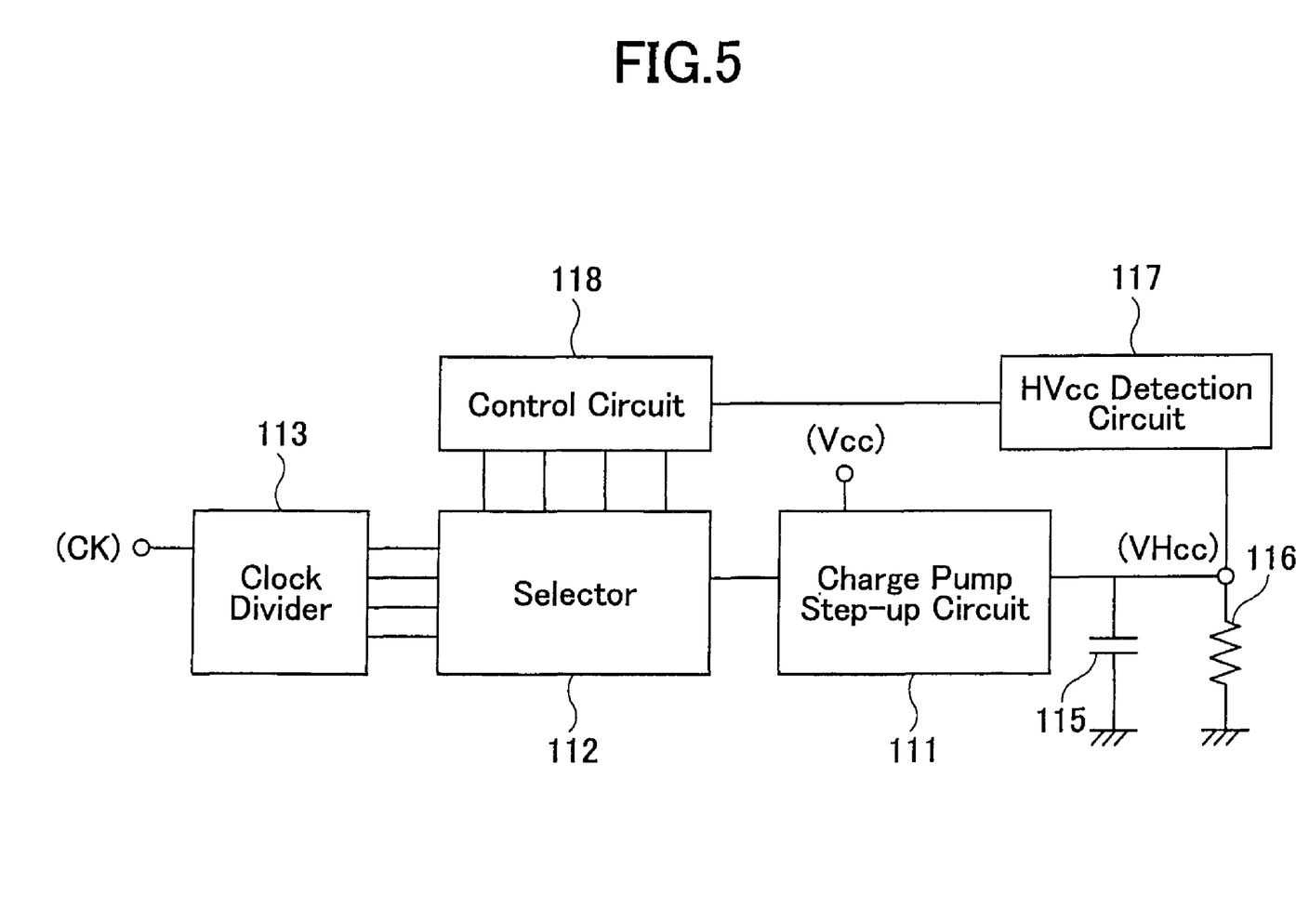
FIG. 5 is a block diagram illustrating another example of the configuration of a step-up circuit in the related art.

FIG. 5 is a block diagram illustrating another example of the configuration of a step-up circuit in the related art.

For example, the step-up circuit in FIG. 5 is disclosed in Japanese Laid Open Patent Application No. 2000-278937 (below, referred to as "reference 2").

In the step-up circuit in FIG. 5, an HVcc detection circuit 117 detects a step-up voltage HVcc, compares the detected step-up voltage HVcc with a reference voltage, and outputs a signal corresponding to a difference between the detected step-up voltage HVcc and the reference voltage to a control circuit 118. In response to the input signal, the control circuit 118 outputs a select signal to a selector 112, the select signal being used for selecting a clock signal having a frequency corresponding to the voltage difference between the detected step-up voltage HVcc and the reference voltage.

In addition, the HVcc detection circuit 117 has plural reference voltages which are used for comparison with the detected step-up voltage HVcc; the HVcc detection circuit 117 selects one of the reference voltages through instructions from the control circuit 118 according to system (like a microcomputer) requests or operation modes, and an output voltage HVcc of a charge pump step up circuit 111 is set according to the selected reference voltage. Therefore, by changing the frequency of a clock signal input to the charge pump step up circuit 111, it is possible to set the step-up voltage HVcc to be any value.

Each of the above techniques of the related art, however, is devised for a single charge pump circuit, but is not suitable for clock signals when using plural charge pump circuits; due to this, problems occur when operating the plural charge pump circuits simultaneously. Specifically, when the plural charge pump circuits are put into operation with the same clock signal, because timings of charging flying capacitors from an input power supply device overlap each other, during the charging, the current output from the input power supply device is large. Due to this, the output voltage from the input power supply device decreases for an instant, and this produces spike noise. When the output voltage from the input power supply device is supplied to a circuit of an apparatus, such spike noise may cause malfunction of the apparatus.

In addition, when the output voltage of a PWM switching regulator is used as the input power supply device of the charge pump circuits, if the ON/OFF timing of switching transistors of the switching regulator overlap the timing of charging the flying capacitors from the input power supply device, the above-mentioned spike noise may become a severe problem.

SUMMARY

In an aspect of this disclosure, there is provided a multi-output power supply device of low noise, the multi-output power supply device having plural DC-DC converters each including a charge pump circuit.

According to another aspect of this disclosure, there is provided a multi-output power supply device that converts a first input voltage input from an input terminal thereof to plural voltages having predetermined different values, and outputs the voltages through plural output terminals, respectively, said multi-output power supply device comprising:

a first power supply circuit that generates a predetermined constant voltage from the first input voltage, and outputs the constant voltage through a first output terminal; and one or more second power supply circuits each including a charge pump circuit, said charge pump circuit using the output voltage of the first power supply circuit as a second input voltage and generating a predetermined constant voltage from the second input voltage, and outputs the predetermined constant voltage through a second output terminal, wherein each of the second power supply circuits changes a period of a charging and discharging cycle for charging and discharging a flying capacitor according to an electric current output from the second output terminal.

Preferably, each of the second power supply circuits shortens the period of the charging and discharging cycle for charging and discharging the flying capacitor when the electric current output from the second output terminal increases.

Preferably, each of the second power supply circuits comprises:

a voltage conversion circuit that charges and discharges the flying capacitor according to an input clock signal, converts the second input voltage, and outputs the converted second input voltage through the second output terminal; and a control circuit that controls voltage conversion in the voltage conversion circuit so that the voltage output from the second output terminal becomes the predetermined constant voltage, wherein the control circuit changes a frequency of a predetermined reference clock signal according to an electric current output from the second output terminal to generate the clock signal, and outputs the obtained clock signal to the voltage conversion circuit.

Preferably, the control circuit comprises:

a clock signal generation circuit that generates plural clock signals having different frequencies from the reference clock signal; and a clock signal selection circuit that exclusively selects one of the clock signals output from the clock signal generation circuit, and outputs the selected clock signal to the voltage conversion circuit.

Preferably, the clock signal generation circuit includes a frequency-division circuit that divides the reference clock signal with predetermined different division ratios to generate and output the clock signals having different frequencies.

Preferably, the clock signal selection circuit comprises:

a selection circuit that selects one of the clock signals output from the clock signal generation circuit according to an input control signal; and an output current detection circuit that detects the electric current output from the second output terminal, and controls operations of the selection circuit according to the detected current, wherein the output current detection circuit controls the selection circuit so that the selection circuit outputs one of the clock signals having a high frequency when the electric current output from the second output terminal is large.

Preferably, the first power supply circuit comprises:

a switching regulator having an inductor, wherein a clock signal defining a switching timing of the switching regulator for charging the inductor has a phase difference with the reference clock signal.

Preferably, the first power supply circuit uses a predetermined triangular signal to perform PWM control on the switching regulator, and the reference clock signal is a rectangular signal having a duty cycle less than 20% and having the same frequency as the triangular signal.

According to another aspect of this disclosure, there is provided a multi-output power supply device that converts a first input voltage input from an input terminal thereof to plural voltages having predetermined different values, and outputs the voltages through plural output terminals as output voltages, respectively, said multi-output power supply device comprising:

a first power supply circuit that generates a predetermined constant voltage from the first input voltage, and outputs the constant voltage through a first output terminal; and plural second power supply circuits each including a charge pump circuit, said charge pump circuit using the output voltage of the first power supply circuit as a second input voltage, generating a predetermined constant voltage from the second input voltage, and outputting the predetermined constant voltage through a second output terminal, wherein the second power supply circuits have different timings of charging and discharging cycles for charging and discharging a flying capacitor.

Preferably, each of the second power supply circuits comprises:

a voltage conversion circuit that charges and discharges the flying capacitor according to an input clock signal, converts the second input voltage, and outputs the converted second input voltage through the second output terminal; and a control circuit that controls voltage conversion in the voltage conversion circuit so that the voltage output from the second output terminal becomes the predetermined constant voltage, wherein the control circuit of each of the second power supply circuits generates the clock signal from a predetermined reference clock signal with the clock signals in different second power supply circuits having different phases, and outputs the obtained clock signal to the corresponding voltage conversion circuit.

In the aforementioned multi-output power supply, there are provided one or more second power supply circuits each including a charge pump circuit for generating a predetermined constant voltage from the output voltage of the first power supply circuit and outputting the predetermined constant voltage through a second output terminal, and each of the second power supply circuits changes a period of a charging and discharging cycle of a flying capacitor according to an electric current output from the second output terminal. Therefore, when plural charge pump circuits are used, it is possible to reduce the likelihood that the charge pump circuits operate with the same clock signal; hence it is possible to reduce spike noise compared to the case in which the same clock signal is used for the charge pump circuits as in the related art, and this results in low noise.

Further, the current output from the second output terminal can be adjusted in a wide range from a small current to a large current, and this reduces switching loss, thus improves efficiency.

In addition, in the aforementioned multi-output power supply device, there are provided plural second power supply circuits each including a charge pump circuit for generating a predetermined constant voltage from the output voltage of the first power supply circuit and outputting the predetermined constant voltage through a second output terminal, and the second power supply circuits have different timings of charging and discharging cycles for charging and discharging a flying capacitor. Due to this, it is possible to prevent, with a simple circuit configuration, overlapping of peaks of input currents of different power supply circuits; hence it is possible to reduce noise occurring in output voltages of the power supply circuit, and this results in low noise of the device.

The aforementioned and other aspects, features, and advantages will become more apparent from the following detailed description of preferred embodiments with reference to the accompanying drawings.

BEST MODE FOR CARRYING OUT THE INVENTION

Below, preferred embodiments of the present invention are explained with reference to the accompanying drawings.

First Embodiment

Figure 1:
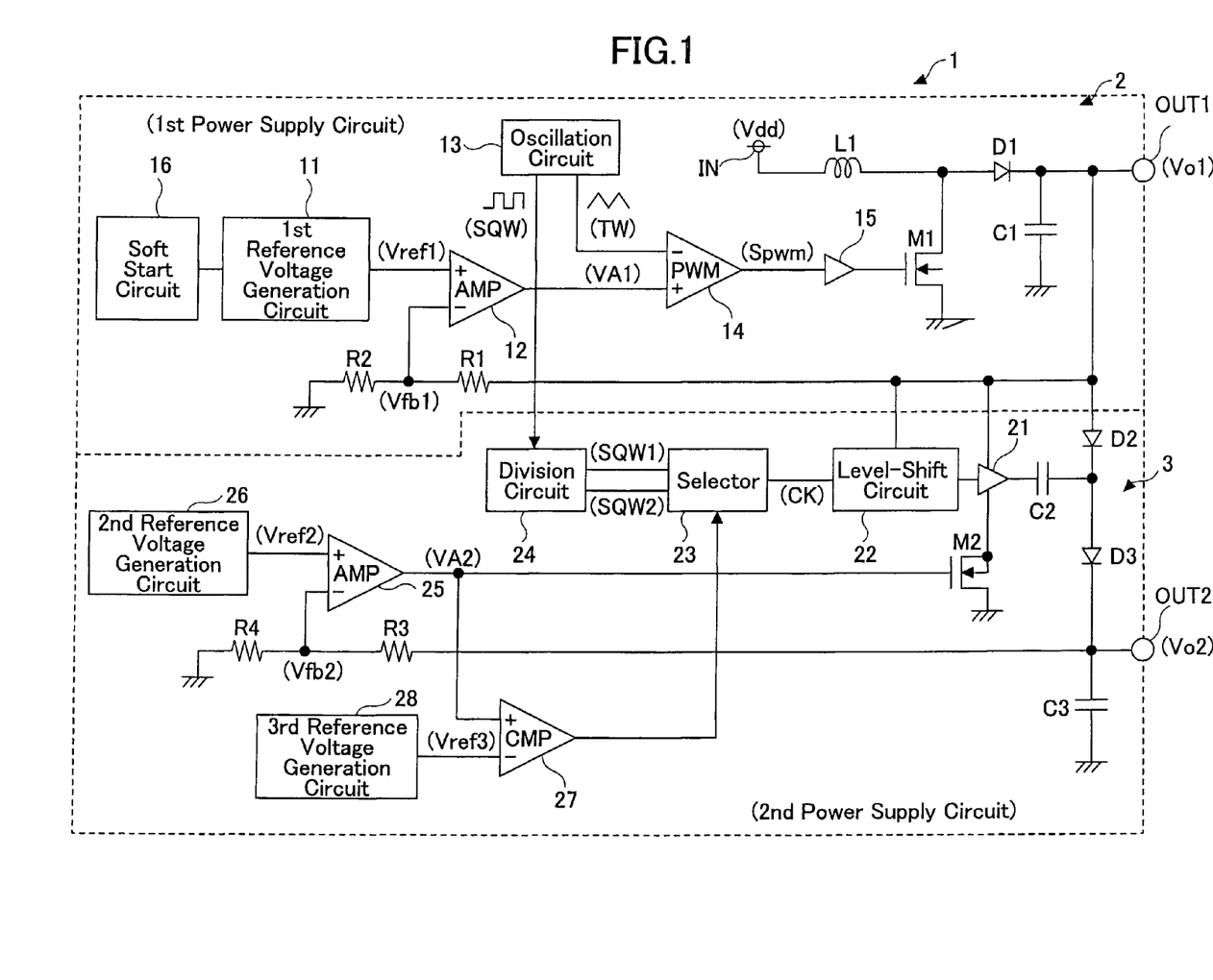
FIG. 1 is a circuit diagram exemplifying a multi-output power supply device according to a first embodiment of the present invention.

FIG. 1 is a circuit diagram exemplifying a multi-output power supply device according to a first embodiment of the present invention.

As shown in FIG. 1, a multi-output power supply device 1 boosts an input voltage Vdd, which is input from an input terminal IN, to plural voltages having specified different values, and outputs the voltages from corresponding output terminals OUT1 and OUT2, respectively. The voltages output from the output terminals OUT1 and OUT2 are referred to as output voltages Vo1 and Vo2, respectively.

The multi-output power supply device 1 includes a first power supply circuit 2, which serves as a step-up switching regulator for generating and outputting the output voltage Vo1, and a second power supply circuit 3, which serves as a step-up charge pump circuit for generating and outputting the output voltage Vo2 with the output voltage Vo1 of the first power supply circuit 2 as an input voltage.

The first power supply circuit 2 includes an inductor L1, a switching transistor M1, and a rectification diode D1. The switching transistor M1 is an NMOS transistor for carrying out switching to boost the input voltage Vdd according to an input control signal, and for charging the inductor L1 with the input voltage Vdd.

In addition, the first power supply circuit 2 includes a first reference voltage generation circuit 11 which generates and outputs a given first reference voltage Vref1, resistors R1 and R2 which are used for detecting the output voltage Vo1, a smoothing capacitor C1, an error amplification circuit 12, an oscillation circuit 13 which generates and outputs a triangular signal TW and a rectangular signal SQW, a PWM comparator 14, a buffer 15 serving as a driving circuit, and a soft start circuit 16.

The second power supply circuit 3 includes a buffer 21 serving as a driving circuit, a level-shift circuit 22, a selector 23, a division circuit 24, an error amplification circuit 25, a second reference voltage generation circuit 26 which generates and outputs a specified second reference voltage Vref2, a comparator 27, a third reference voltage generation circuit 28 which generates and outputs a specified third reference voltage Vref3, resistors R3 and R4 which are used for detecting the output voltage Vo2, an NMOS transistor M2, diodes D2 and D3, a flying capacitor C2, and an output capacitor C3.

Here, the buffer 21, the NMOS transistor M2, the diodes D2 and D3, the flying capacitor C2 and the output capacitor C3 constitute the "voltage conversion circuit" in claims of the present invention; the level-shift circuit 22, the selector 23, the division circuit 24, the error amplification circuit 25, the second reference voltage generation circuit 26, the comparator 27, the third reference voltage generation circuit 28, and the resistors R3 and R4 constitute the "control circuit" in claims of the present invention; the error amplification circuit 25, the second reference voltage generation circuit 26, the comparator 27, the third reference voltage generation circuit 28, and the resistors R3 and R4 constitute the "output current detection circuit" in claims of the present invention; the rectangular signal SQW corresponds to the "reference clock signal" in claims of the present invention; and the output terminals OUT1 and OUT2 correspond to the "first output terminal" and the "second output terminal", respectively, in claims of the present invention.

In the first power supply circuit 2, the inductor L1 is connected between the input terminal IN and the drain of the switching transistor M1, and the source of the switching transistor M1 is connected to ground. The anode of the diode D1 is connected to the connection portion of the inductor L1 and the drain of the switching transistor M1, and the cathode of the diode D1 is connected to the output terminal OUT1. The smoothing capacitor C1 is connected between the output terminal OUT1 and ground, the resistors R1 and R2 are connected in series between the output terminal OUT1 and ground, and a division voltage Vfb1 is extracted from the connection portion of the resistors R1 and R2.

In the error amplification circuit 12, the division voltage Vfb1 is input to an inverted input terminal, the first reference voltage Vref1 is input to a non-inverted input terminal, an output signal VA1 is generated by amplifying a voltage difference between the division voltage Vfb1 and the first reference voltage Vref1, and the resulting signal is output from an output terminal of the error amplification circuit 12 as an output signal VA1.

In the PWM comparator 14, the output signal VA1 from the error amplification circuit 12 is input to a non-inverted input terminal, and the triangular signal TW is input to an inverted input terminal. The PWM comparator 14 uses the triangular signal TW to perform PWM modulation on the output signal VA1, and generates and outputs a pulse signal Spwm. The pulse signal Spwm is input to the gate of the switching transistor M1 through the buffer 15.

After a certain time period elapses since the soft start circuit 16 is started, in order that an on-duty cycle of the pulse signal Spwm gradually lengthens at a specified speed, the soft start circuit 16 directs the first reference voltage generation circuit 11 to step up the first reference voltage Vref1 gradually at a specified speed, thereby, preventing a too large current and overshoot of the output voltage Vo1 from the input terminal IN.

In the second power supply circuit 3, the cathode of the diode D2 is connected to the anode of the diode D3, and the cathode of the diode D3 is connected to the output terminal OUT2. The flying capacitor C2 is connected between an output terminal of the buffer 21 and the cathode of the diode D2, and the output capacitor C3 is connected between the output terminal OUT2 and ground. The buffer 21 and the level-shift circuit 22 operate with the output voltage Vo1 as a power voltage, and the NMOS transistor M2 is connected between a negative power supply end of the buffer 21 and ground.

The resistors R3 and R4 are connected in series between the output terminal OUT2 and ground, and a division voltage Vfb2 is extracted from the connection portion of the resistors R3 and R4.

In the error amplification circuit 25, the division voltage Vfb2 is input to an inverted input terminal, the second reference voltage Vref2 is input to a non-inverted input terminal, an output signal VA2 is generated by amplifying a voltage difference between the division voltage Vfb2 and the second reference voltage Vref2, and the resulting signal is output from an output terminal of the error amplification circuit 25 as the output signal VA2. The output signal VA2 from the error amplification circuit 25 is input to the gate of the NMOS transistor M2 and a non-inverted input terminal of the comparator 27, the third reference voltage Vref3 is input to the inverted input terminal of the comparator 27, and the output signal from the comparator 27 is input to the selector 23.

The rectangular signal SQW from the oscillation circuit 13 is input to the division circuit 24; the division circuit 24 divides the frequency of the rectangular signal SQW by two, thus obtaining a rectangular signal SQW1, and divides the frequency of the rectangular signal SQW by four, thus obtaining a rectangular signal SQW2; and outputs the rectangular signal SQW1 and the rectangular signal SQW2 to corresponding input terminals of the selector 23. The selector 23 exclusively selects one of the rectangular signal SQW1 and the rectangular signal SQW2 according to the signal from the comparator 27, and outputs the selected signal to the level-shift circuit 22 as a clock signal CK. The level-shift circuit 22 shifts the level of the clock signal CK, and outputs the resulting signal to an input terminal of the buffer 21.

Note that the oscillation circuit 13 may generate a rectangular signal SQW having the same frequency as the triangular signal TW and having a duty cycle less than 20%. In doing so, it is possible to generate a phase difference between clock signals, and provide a reference of a switching timing of the switching transistor M1 and the rectangular signal SQW serving as the reference clock signal.

In the multi-output power supply device 1 having the above circuit configuration, in the second power supply circuit 3, when the output signal of the buffer 21 is at a low level, the flying capacitor C2 is charged by the output voltage Vo1 of the first power supply circuit 2 through the diode D2. At this moment, since the charging current of the flying capacitor C2 is regulated by the drain current of the NMOS transistor M2, the charge stored in the flying capacitor C2 is controlled by the time period when the output signal of the buffer 21 is maintained in the lower level, and the drain current of the NMOS transistor M2. When the output signal of the buffer 21 is at a high level, the voltage at the end of the flying capacitor C2 on the side of the diode D2 rises to the output voltage Vo1 or higher, the output capacitor C3 is charged by this voltage through the diode D3. Due to this, the output voltage Vo2 of the second power supply circuit 3 is approximately equal to the output voltage Vo1 of the first power supply circuit 2 added to the charging voltage of the flying capacitor C2 if voltage drops on the diode D2 and the diode D3 are neglected.

On the other hand, in the error amplification circuit 25, the gate voltage of the NMOS transistor M2 is controlled so that the division voltage Vfb2 becomes equal to the second reference voltage Vref2. For this purpose, when the output current from the output terminal OUT2 of the second power supply circuit 3 increases, and the output voltage Vo2 decreases, the output voltage of the error amplification circuit 25 increases, the gate voltage of the NMOS transistor M2 is increased accordingly, and the drain current of the NMOS transistor M2 increases. Due to this, the charge stored in the flying capacitor C2 increases, the voltage on the flying capacitor C2 increases, and the output voltage Vo2 increases.

Conversely, when the output voltage Vo2 of the second power supply circuit 3 increases, the output voltage of the error amplification circuit 25 decreases, the drain current of the NMOS transistor M2 is decreased accordingly, and the charge stored in the flying capacitor C2 decreases.

In this way, in the second power supply circuit 3, the charge stored in the flying capacitor C2 is controlled according to the output voltage Vo2, and it is possible to control the output voltage Vo2 to be equal to a preset constant voltage.

As most of the power loss of the charge pump circuit serving as the second power supply circuit 3 is caused by the switching element in the buffer 21, when the frequency of the clock signal CK is high, the loss increases, and the efficiency decreases. For this reason, it is desirable that the second power supply circuit 3 operate with the clock signal CK of a frequency as low as possible, and this improves the efficiency. However, when the frequency of the clock signal CK is low, the number of times of charging the output capacitor C3 by the charge stored in the flying capacitor C2 becomes small; thus the output current from the output terminal OUT2 of the second power supply circuit 3 increases, and the output voltage Vo2 decreases. Therefore, in the second power supply circuit 3, when the output current increases, and the gate voltage of the NMOS transistor M2 is increased to a preset value or higher, the frequency of the clock signal CK is increased.

Namely, when the gate voltage of the NMOS transistor M2 is higher than the third reference voltage Vref3, the comparator 27 outputs a high level signal. Receiving the high level signal from the comparator 27, the selector 23 selects the rectangular signal SQW1 to increase the frequency of the clock signal CK. As a result, the number of times of charging the flying capacitor C2 is doubled. In addition, when the gate voltage of the NMOS transistor M2 is lower than the third reference voltage Vref3, the comparator 27 outputs a low level signal. Receiving the low level signal from the comparator 27, the selector 23 selects the rectangular signal SQW2 to output the clock signal CK. As a result, the number of times of charging the flying capacitor C2 is reduced by half.

Since when the frequency of the clock signal CK is high, the gate voltage of the NMOS transistor M2 decreases slightly, a certain amount of hysteresis can be provided at an input end of the comparator 27 to cover this voltage decease. Due to this, it is possible to ensure stable operations.

In addition, in the above, for simplicity, it is assumed that there is only one second power supply circuit 3. Certainly, the present embodiment may have plural second power supply circuits 3. In this case, the rectangular signal SQW from the oscillation circuit 13 is input to the division circuits 24 of the second power supply circuits 3.

In addition, in the above, for simplicity, it is assumed that the rectangular signal SQW1 and the rectangular signal SQW2 input to the selector 23 are obtained by dividing the frequency of the rectangular signal SQW serving as the reference clock signal by two, and dividing the frequency of the rectangular signal SQW by four. Certainly, the present embodiment is not limited to this. For example, instead of the rectangular signal SQW1 and the rectangular signal SQW2, the rectangular signal SQW may be used. In addition, the number of signals input to the selector 23 may be three or more. In this case, however, it is sufficient to accordingly increase the number of the control signal input terminals of the selector 23, and provide a sufficient number of reference voltages different from the third reference voltage Vref3.

According to the multi-output power supply device of the first embodiment of the present invention, in the charge pump circuit serving as the second power supply circuit 3, in which the output voltage Vo2 is generated from the output voltage Vo1 of the first power supply circuit 2, when the output current from the output terminal OUT2 of the second power supply circuit 3 increases, and the gate voltage of the NMOS transistor M2 is increased to a preset value or higher, the frequency of the clock signal CK is increased. As a result, since it is possible to appropriately change the frequency of the clock signal CK depending on the condition of the load connected to the output terminal OUT2. Even when plural charge pump circuits are used, it is possible to reduce the likelihood that the charge pump circuits operate with the same clock signal; hence it is possible to reduce spike noise compared to the case in which the same clock signal is used for the charge pump circuits as in the related art, and this results in low noise.

Further, the current output from the second output terminal can be adjusted in a wide range from a small current to a large current; this reduces switching loss, thus improves efficiency.

Second Embodiment

In the first embodiment, the frequency of the clock signal CK is appropriately changed depending on the condition of the load connected to the output terminal OUT2 of the charge pump circuit serving as the second power supply circuit 3.

In the present embodiment, instead of the frequency of the clock signal CK, the phase of the clock signal CK used in the charge pump circuit is appropriately changed.

Figure 2:
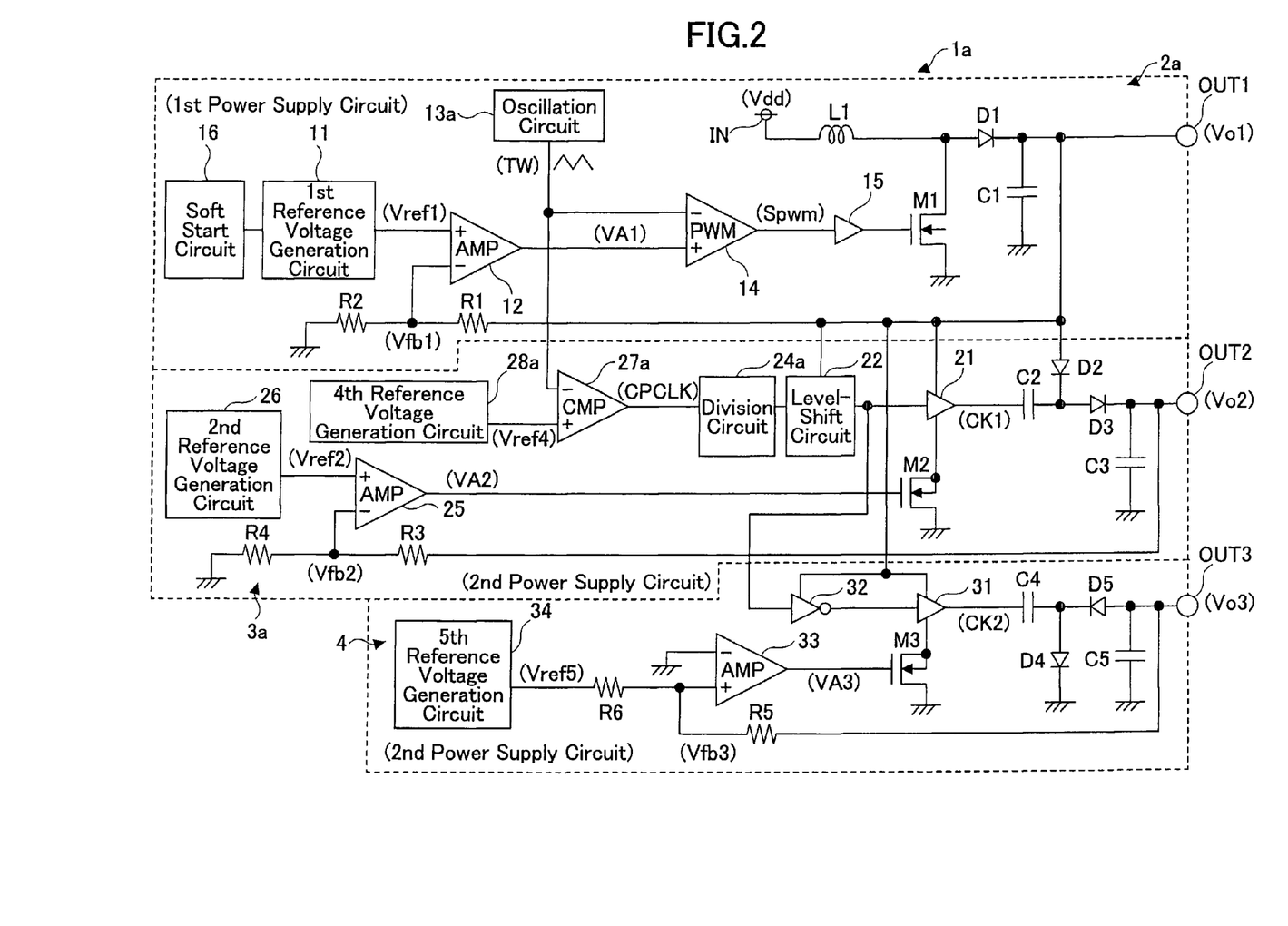
FIG. 2 is a circuit diagram exemplifying a multi-output power supply device according to a second embodiment of the present invention.

FIG. 2 is a circuit diagram exemplifying a multi-output power supply device according to a second embodiment of the present invention.

In FIG. 2, the same reference numbers are assigned to the same components as those illustrated in FIG. 1, overlapping descriptions are omitted, and only differences between the first embodiment and the second embodiment are described.

A multi-output power supply device 1a shown in FIG. 2 is different from the multi-output power supply device 1 in FIG. 1 in that the oscillation circuit 13, the division circuit 24, the first power supply circuit 2, and the second power supply circuit 3 in FIG. 1 are changed to an oscillation circuit 13a, a division circuit 24a, a first power supply circuit 2a, and a second power supply circuit 3a. Further, there is additionally provided a second power supply circuit 4 in FIG. 2.

In FIG. 2, the oscillation circuit 13a generates and outputs only the triangular signal TW, the division circuit 24a divides the frequency of the input signal with only one division ratio; in the second power supply circuit 3a, there are not the selector 23, the comparator 27, the third reference voltage generation circuit 28 as shown in FIG. 1, but there is provided a comparator 27a and a fourth reference voltage generation circuit 28a.

As shown in FIG. 2, the multi-output power supply device 1a boosts an input voltage Vdd, which is input from an input terminal IN, to plural voltages having specified different values, and outputs the voltages from corresponding output terminals OUT1, OUT2, and OUT3, respectively. The voltages output from the output terminals OUT1, OUT2, and OUT3 are referred to as output voltages Vo1, Vo2, and Vo3, respectively.

The multi-output power supply device 1a includes the first power supply circuit 2a, which serves as a step-up switching regulator for generating and outputting the output voltage Vo1, a second power supply circuit 3a, which serves as a step-up charge pump circuit for generating and outputting the output voltage Vo2 with the output voltage Vo1 of the first power supply circuit 2a as an input voltage, and the second power supply circuit 4, which serves as a step-up charge pump circuit for generating and outputting a negative output voltage Vo3 with the output voltage Vo1 of the first power supply circuit 2a as an input voltage.

The first power supply circuit 2a includes an inductor L1, a switching transistor M1, a rectification diode D1, a first reference voltage generation circuit 11, resistors R1 and R2, a smoothing capacitor C1, an error amplification circuit 12, an oscillation circuit 13a which generates and outputs a triangular signal TW, a buffer 15, and a soft start circuit 16.

The second power supply circuit 3a includes a buffer 21, a level-shift circuit 22, a selector 23, a division circuit 24, an error amplification circuit 25, a second reference voltage generation circuit 26, a comparator 27a, a fourth reference voltage generation circuit 28a which generates and outputs a specified fourth reference voltage Vref4, resistors R3 and R4, an NMOS transistor M2, diodes D2 and D3, a flying capacitor C2, and an output capacitor C3.

The second power supply circuit 4 includes a buffer 31, an inverter 32, an error amplification circuit 33, a fifth reference voltage generation circuit 34 which generates and outputs a given fifth reference voltage Vref5, resistors R5 and R6, an NMOS transistor M3, diodes D4 and D5, a flying capacitor C4, and an output capacitor C5.

In the second power supply circuit 3a, the level-shift circuit 22, the division circuit 24a, the error amplification circuit 25, the second reference voltage generation circuit 26, the comparator 27a, the fourth reference voltage generation circuit 28a, and the resistors R3 and R4 constitute the "control circuit" in claims of the present invention.

In the second power supply circuit 4, the buffer 31, the NMOS transistor M3, the diodes D4 and D5, the flying capacitor C4 and the output capacitor C5 constitute the "voltage conversion circuit" in claims of the present invention; the inverter 32, the error amplification circuit 33, the fifth reference voltage generation circuit 34, and the resistors R5 and R6 constitute the "control circuit" in claims of the present invention; and the output terminals OUT2 and OUT3 correspond to the "second output terminal" in claims of the present invention.

In the first power supply circuit 2a is the same as the first power supply circuit 2 except that the oscillation circuit 13a generates and outputs only the triangular signal TW.

In the second power supply circuit 3a, the triangular signal TW is input to an inverted input terminal of the comparator 27a, and the fourth reference voltage Vref4 is input to a non-inverted input terminal of the comparator 27a. The output signal CPCLK from the comparator 27a is input to the division circuit 24a, the division circuit 24a divides the frequency of the output signal CPCLK by the preset division ratio, and the resulting signal is output to the level-shift circuit 22. Other operations of the second power supply circuit 3a are the same as the second power supply circuit 3 in FIG. 1, and overlapping descriptions are omitted.

In the second power supply circuit 4, the anode of the diode D5 is connected to the output terminal OUT3, the cathode of the diode D5 is connected to the anode of the diode D4, and further, the cathode of the diode D4 is grounded. The flying capacitor C4 is connected between an output terminal of the buffer 31 and the cathode of the diode D5, and the output capacitor C5 is connected between the output terminal OUT3 and ground. The buffer 31 and the inverter 32 operate with the output voltage Vo1 as a power voltage, and the NMOS transistor M3 is connected between a negative power supply end of the buffer 31 and ground.

The output signal from the level-shift circuit 22 is input to an input terminal of the inverter 32, and an output terminal of the inverter 32 is connected to an input terminal of the buffer 31. The resistor R5 is connected between the output terminal OUT3 and a non-inverted input terminal of the error amplification circuit 33, and the resistor R6 is connected between the output terminal of the fifth reference voltage generation circuit 34 and the non-inverted input terminal of the error amplification circuit 33.

In the error amplification circuit 33, the inverted input terminal is connected to ground, and the output terminal is connected to the gate of the NMOS transistor M3. The output signal CPCLK from the comparator 27a, serving as the reference clock signal, has the same frequency as the triangular signal TW and having a duty cycle less than 20%. In doing so, it is possible to generate a phase difference between a clock signal providing a reference of a switching timing of the switching transistor M1 and a clock signal CK1 output from the buffer 21.

Figure 3:
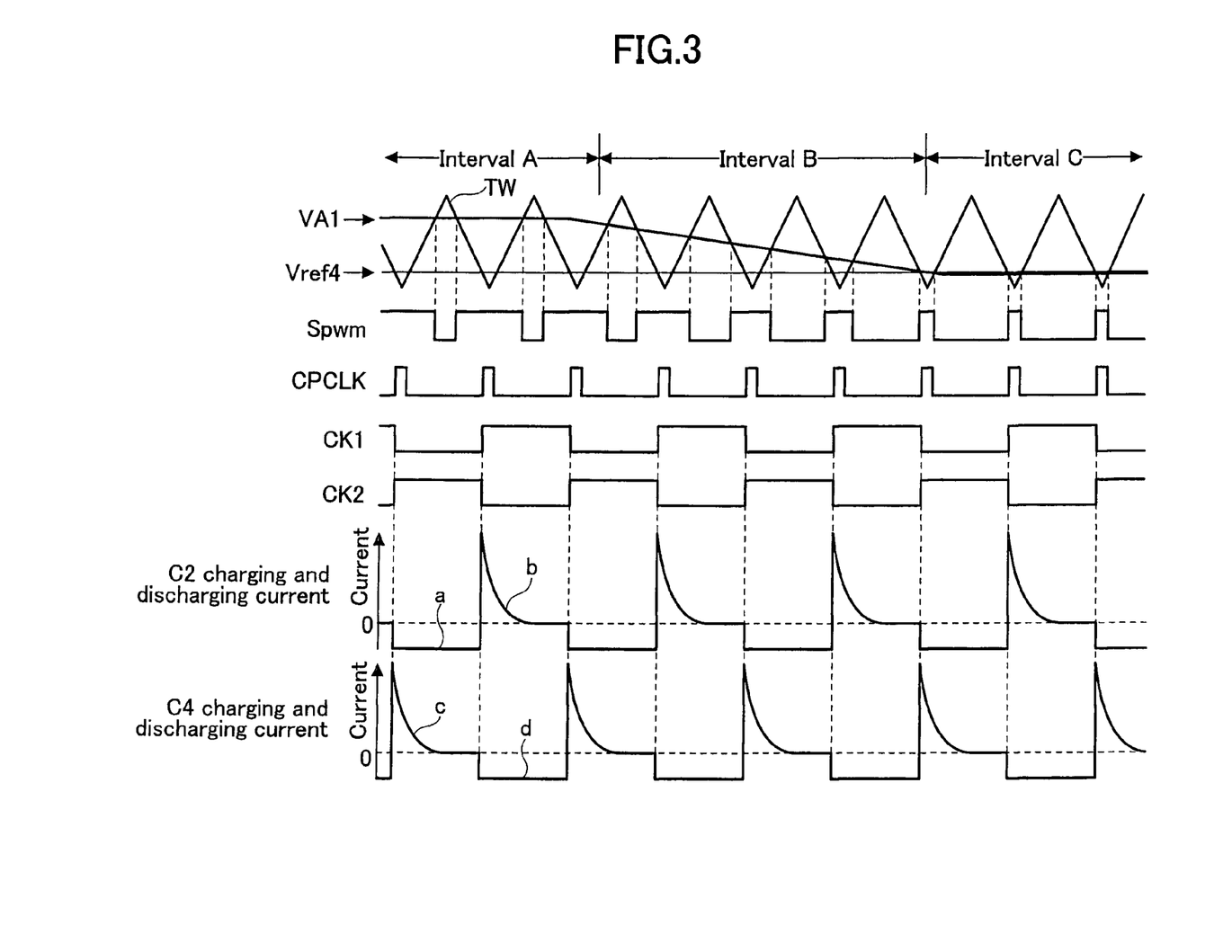
FIG. 3 is a timing chart illustrating operations of the multi-output power supply device 1a having the above circuit configuration.

FIG. 3 is a timing chart illustrating operations of the multi-output power supply device 1a having the above circuit configuration.

In FIG. 3, the "clock signal CK1" is the output signal of the buffer 21, and the "clock signal CK2" is the output signal of the buffer 31; "C2 charging and discharging current" is the current for charging and discharging the flying capacitor C2, and "C4 charging and discharging current" is the current for charging and discharging the flying capacitor C4.

In addition, in FIG. 3, a positive current represents a current flowing from the output voltage Vo1 to the flying capacitor C2 or the flying capacitor C4 through the output terminal of the buffer 21 or the buffer 31, whereas a negative current represents a current flowing from the side of the flying capacitor C2 or the flying capacitor C4 to ground through the output terminal of the buffer 21 or the buffer 31.

In FIG. 3, an interval A represents an interval in which the output current of the first power supply circuit 2a is large, an interval C represents an interval in which the output current of the first power supply circuit 2a is small, and an interval B represents an interval in which the output current of the first power supply circuit 2a transits from having a large output current to having a small output current.

In the interval A, since the output current from the output terminal OUT1 of the first power supply circuit 2a is large, the output signal VA1 from the error amplification circuit 12 is at a high voltage, thus, widths of high-level pulses of the pulse signal Spwm output from the PWM comparator 14 increases; namely, the pulse signal Spwm is at a high level for a long time. As the switching transistor M1 is turned ON when the pulse signal Spwm is at the high level, in the interval A, the increased pulse width of the pulse signal Spwm indicates that the time period in which the switching transistor M1 is turned ON becomes long.

In the interval B, the output current from the output terminal OUT1 of the first power supply circuit 2a decreases gradually; and the widths of high-level pulses of the pulse signal Spwm output from the PWM comparator 14 decrease gradually, namely, the time period in which the pulse signal Spwm is at the high level becomes short.

In the interval C, since the output current from the output terminal OUT1 of the first power supply circuit 2a is small, the pulse widths of the pulse signal Spwm output from the PWM comparator 14 are small, namely, the time period in which the pulse signal Spwm is at the high level is short.

The triangular signal TW from the oscillation circuit 13a is compared to the fourth reference voltage Vref4 in the comparator 27a, and the output signal CPCLK is output from the output terminal of the comparator 27a. The frequency of the clock signal CPCLK is divided by the division circuit 24a with the preset division ratio, and the resulting signal is input to the buffer 21 through the level-shift circuit 22, and is used as a clock signal of the charge pump circuit of the second power supply circuit 3a. The output signal from the level-shift circuit 22 is input to the buffer 31 through the inverter 32, and the output signal from the buffer 31 is used as a clock signal of the charge pump circuit of the second power supply circuit 4.

Below, descriptions are given to relationships among the clock signal CK1, the clock signal CK2, the charging and discharging current for charging and discharging the flying capacitor C2, and the charging and discharging current for charging and discharging the flying capacitor C4.

When the clock signals CK1 is at a low level, a charging current is supplied to the flying capacitor C2 through the diode D2 with the output voltage Vo1 of the first power supply circuit 2a as a power voltage. However, since the NMOS transistor M2 is connected between a negative power supply end of the buffer 21 and ground, the charging current of the flying capacitor C2 is limited by the drain current of the NMOS transistor M2.

The output signal VA2 from the error amplification circuit 25 is input to the gate of the NMOS transistor M2, the second reference voltage Vref2 is input to a non-inverted input terminal of the error amplification circuit 25, and the division voltage Vfb2 is input to an inverted input terminal of the error amplification circuit 25. Therefore, the output signal VA2 from the error amplification circuit 25 depends on the output voltage Vo2 of the second power supply circuit 3a. Specifically, when the output voltage Vo2 of the second power supply circuit 3a increases, the output voltage VA2 of the error amplification circuit 25 decreases, and when the output voltage Vo2 of the second power supply circuit 3a decreases, the output voltage VA2 of the error amplification circuit 25 increases. Due to this, the drain current of the NMOS transistor M2 becomes a constant current associated with the output voltage Vo2 of the second power supply circuit 3a, as shown in a portion "a" in FIG. 3.

On the other hand, when the clock signals CK1 is at a high level, the voltage of the end of the flying capacitor C2 in connection with the anode of the diode D3 increases, and the output capacitor C3 is quickly charged through the diode D3. As a result, as shown in a portion "b" in FIG. 3, a large charging current is generated under the output voltage Vo1 of the first power supply circuit 2a through the output terminal of the buffer 21. This charging current drops drastically along with charging of the output capacitor C3.

In addition, when the clock signals CK2 is at a high level, a large charging current is supplied to the flying capacitor C4 under the output voltage Vo1 of the first power supply circuit 2a through the output terminal of the buffer 31. As shown in a portion "c" in FIG. 3, immediately after the clock signals CK2 rises to the high level, a large charging current is conducted, and this charging current drops drastically along with charging of the output capacitor C4.

When the clock signals CK2 is at the low level, the voltage of the end of the flying capacitor C4 in connection with the cathode of the diode D5 decreases, the output capacitor C5 is charged through the diode D5. However, since the NMOS transistor M3 is connected between a negative power supply end of the buffer 31 and ground, the charging current of the flying capacitor C4 is limited by the drain current of the NMOS transistor M3.

The output signal VA3 from the error amplification circuit 33 is input to the gate of the NMOS transistor M3; a division voltage Vfb3, which is obtained by dividing the voltage between the output voltage Vo3 from the second power supply circuit 4 and the fifth reference voltage Vref5 with the resistors R5 and R6, is input to a non-inverted input terminal of the error amplification circuit 33; and an inverted input terminal of the error amplification circuit 33 is grounded.

Therefore, the output signal VA3 from the error amplification circuit 33 depends on the output voltage Vo3 of the second power supply circuit 4. Due to this, the drain current of the NMOS transistor M3 becomes a constant current associated with the output voltage Vo3 of the second power supply circuit 4. As shown in a portion "d" in FIG. 3, the charging current to the flying capacitor C4 is nearly a constant current.

As described above, when the clock signal CK1 and the clock signal CK2, which are used in the second power supply circuit 3a and the second power supply circuit 4, respectively, are the same, the inverter 32 generates a difference of 180 degrees between the phase of the clock signal CK1 and the phase of the clock signal CK2; hence it is possible to prevent overlapping of the peak of the current to the second power supply circuit 3a and the peak of the current to the second power supply circuit 4, which currents are supplied by the first power supply circuit 2a, and reduce a voltage change caused by a change of the load of the output voltage Vo1 of the first power supply circuit 2a.

Next, descriptions are given to the fourth reference voltage Vref4.

The fourth reference voltage Vref4 is set to be slightly higher than the lower limit voltage of the triangular signal TW. Due to this, the clock signal CPCLK output from the comparator 27a and has a high-level duty cycle less than 20%.

As shown in FIG. 3, the timing of the peak of the current, which is supplied from the first power supply circuit 2a to the second power supply circuit 3a and the second power supply circuit 4, is immediately after the clock signal CPCLK rises from the low level to the high level. In addition, the timing of the peak of the current, which is supplied from the input voltage Vdd to the first power supply circuit 2a, is at the time when the pulse signal Spwm (not illustrated) falls from the high level to the low level.

Upon this, the fourth reference voltage Vref4 is set so that the timing of the peak current output from the first power supply circuit 2a and the timing of the peak current output from the second power supply circuit 3a and the second power supply circuit 4 do not overlap when the output current from the output terminal OUT1 of the first power supply circuit 2a is relatively large even in the interval A and the interval B, in which the output current from the output terminal OUT1 of the first power supply circuit 2a is large.

In the interval C, in which the output current from the output terminal OUT1 of the first power supply circuit 2a is small, the timing of the peak current output from the first power supply circuit 2a and the timing of the peak current output from the second power supply circuit 3a and the second power supply circuit 4 overlap. However, since the currents are small, even when the timing of the peak current output from the first power supply circuit 2a and the timing of the peak current output from the second power supply circuit 3a and the second power supply circuit 4 overlap, there is no large influence.

Note that in FIG. 2, it is described that the second power supply circuit 4 is a charge pump circuit which generates and outputs a negative voltage. Certainly, the second power supply circuit 4 can be a charge pump circuit which generates and outputs a positive voltage, like the second power supply circuit 3a. In addition, in FIG. 2, it is described there are two charge pump circuits which use clock signals having the same frequency. Certainly, the present embodiment is applicable to the case in which three or more charge pump circuits use clock signals having the same frequency. When the number of the charge pump circuits increase, it is sufficient to reduce the phase differences of different clock signals so that current peaks of the charge pump circuits do not overlap.

According to the multi-output power supply device of the second embodiment of the present invention, the inverter 32 generates a difference of 180 degrees between the phase of the clock signal CK1, which is used in the second power supply circuit 3a, and the phase of the clock signal CK2, which is used in the second power supply circuit 4; thus the peak of the current to the second power supply circuit 3a is different from the peak of the current to the second power supply circuit 4. As a result, it is possible to reduce noise in output voltages of power supply circuits.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2007-182230 filed on Jul. 11, 2007, the entire contents of which are hereby incorporated herein by reference.

The invention claimed is:

1. A multi-output power supply device that converts a first input voltage input from an input terminal thereof to a plurality of voltages having predetermined different values, and outputs the voltages through a plurality of output terminals, respectively, said multi-output power supply device comprising:

a first power supply circuit that generates a predetermined constant voltage from the first input voltage, and outputs the constant voltage through a first output terminal; and one or more second power supply circuits each including a charge pump circuit, said charge pump circuit using the output voltage of the first power supply circuit as a second input voltage, generating a predetermined constant voltage from the second input voltage, and outputting the predetermined constant voltage through a second output terminal, wherein each of the second power supply circuits changes a period of a charging and discharging cycle for charging and discharging a flying capacitor of the respective second power supply circuit according to an electric current output from the second output terminal, wherein each of the second power supply circuits includes a voltage conversion circuit that charges and discharges the flying capacitor according to a clock signal, converts the second input voltage, and outputs the converted second input voltage through the second output terminal, and a control circuit that controls voltage conversion in the voltage conversion circuit so that the voltage output from the second output terminal becomes the predetermined constant voltage, wherein the control circuit changes a frequency of a predetermined reference clock signal according to an electric current output from the second output terminal to generate the clock signal, and outputs the obtained clock signal to the voltage conversion circuit.

2. The multi-output power supply device as claimed in claim 1, wherein each of the second power supply circuits shortens the period of the charging and discharging cycle for charging and discharging the flying capacitor when the electric current output from the second output terminal increases.

3. The multi-output power supply device as claimed in claim 1, wherein the control circuit comprises:
   a clock signal generation circuit that generates a plurality of clock signals having different frequencies from the reference clock signal; and
   a clock signal selection circuit that exclusively selects one of the clock signals output from the clock signal generation circuit, and outputs the selected clock signal to the voltage conversion circuit.

4. The multi-output power supply device as claimed in claim 3, wherein the clock signal generation circuit includes a frequency-division circuit that divides the reference clock signal with predetermined different division ratios to generate and output the clock signals having different frequencies.

5. The multi-output power supply device as claimed in claim 4, wherein the clock signal selection circuit comprises:
   a selection circuit that selects one of the clock signals output from the clock signal generation circuit according to an input control signal; and
   an output current detection circuit that detects the electric current output from the second output terminal, and controls operations of the selection circuit according to the detected current,
   wherein the output current detection circuit controls the selection circuit so that the selection circuit outputs one of the clock signals having a high frequency when the electric current output from the second output terminal is large.

6. The multi-output power supply device as claimed in claim 1, wherein the first power supply circuit comprises:
   a switching regulator having an inductor,
   wherein a clock signal defining a switching timing of the switching regulator for charging the inductor has a phase difference with the reference clock signal.

7. The multi-output power supply device as claimed in claim 6, wherein the first power supply circuit uses a predetermined triangular signal to perform PWM control on the switching regulator, and the reference clock signal is a rectangular signal having a duty cycle less than 20% and having the same frequency as the triangular signal.

8. The multi-output power supply device as claimed in claim 1, wherein in a case that the electric current output from the second output terminal increases, the control circuit increases the frequency of the predetermined reference clock signal to generate the clock signal, and outputs the obtained clock signal to the voltage conversion circuit.

9. The multi-output power supply device as claimed in claim 8, wherein the voltage conversion circuit reduces the period of charging the flying capacitor, based on the received clock signal.

10. The multi-output power supply device as claimed in claim 1, wherein in a case that the electric current output from the second output terminal decreases, the control circuit decreases the frequency of the predetermined reference clock signal to generate the clock signal, and outputs the obtained clock signal to the voltage conversion circuit.

11. The multi-output power supply device as claimed in claim 10, wherein the voltage conversion circuit increases the period of charging the flying capacitor, based on the received clock signal.

12. A multi-output power supply device that converts a first input voltage input from an input terminal thereof to a plurality of voltages having predetermined different values, and outputs the voltages through a plurality of output terminals as output voltages, respectively, said multi-output power supply device comprising:
   a first power supply circuit that generates a predetermined constant voltage from the first input voltage, and outputs the constant voltage through a first output terminal; and
   a plurality of second power supply circuits each including a charge pump circuit, said charge pump circuit using the output voltage of the first power supply circuit as a second input voltage, generating a predetermined constant voltage from the second input voltage, and outputting the predetermined constant voltage through a second output terminal,
   wherein the second power supply circuits have different timings of charging and discharging cycles for charging and discharging corresponding flying capacitors of the respective second power supply circuits,
   wherein each of the second power supply circuits includes
      a voltage conversion circuit that charges and discharges the corresponding flying capacitor according to a clock signal, converts the second input voltage, and outputs the converted second input voltage through the second output terminal, and
      a control circuit that controls voltage conversion in the voltage conversion circuit so that the voltage output from the second output terminal becomes the predetermined constant voltage,
   wherein the control circuit of each of the second power supply circuits generates the clock signal from a predetermined reference clock signal with the clock signals in different second power supply circuits having different phases, and outputs the obtained clock signal to the corresponding voltage conversion circuit.

* * * * *